United States Patent
Krasner

(10) Patent No.: US 7,024,215 B2
(45) Date of Patent: Apr. 4, 2006

(54) METHODS AND APPARATUSES FOR MEASURING FREQUENCIES OF BASESTATIONS IN CELLULAR NETWORKS USING MOBILE GPS RECEIVERS

(75) Inventor: Norman F. Krasner, San Carlos, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 11/187,175

(22) Filed: Jul. 21, 2005

(65) Prior Publication Data
US 2005/0255859 A1 Nov. 17, 2005

Related U.S. Application Data

(62) Division of application No. 10/189,044, filed on Jul. 2, 2002, now Pat. No. 6,937,872.

(60) Provisional application No. 60/372,944, filed on Apr. 15, 2002.

(51) Int. Cl.
*H04B 15/00* (2006.01)

(52) U.S. Cl. ............... 455/502; 455/456.1; 342/357.1; 370/503; 370/350

(58) Field of Classification Search ............... 455/502, 455/456.1; 342/357.1; 370/350, 503
See application file for complete search history.

(56) References Cited

U.S. PATENT DOCUMENTS

| 6,424,826 | B1 * | 7/2002 | Horton et al. ............... 455/255 |
| 6,839,547 | B1 * | 1/2005 | Nir et al. ....................... 455/71 |
| 2004/0198394 | A1 * | 10/2004 | Syrjarinne et al. ....... 455/456.1 |

FOREIGN PATENT DOCUMENTS

WO    WO 99/50985    * 10/1999

* cited by examiner

*Primary Examiner*—George Eng
*Assistant Examiner*—Julie E. Stein
(74) *Attorney, Agent, or Firm*—Philip Wadsworth; Bruce W. Greenhaus; Andrea L. Mays

(57) ABSTRACT

Methods and systems for frequency synchronizing base stations in a cellular communication system. In one aspect of the invention, a method to measure a frequency related to a base station of a cellular communication system includes receiving a satellite positioning system signal; determining a frequency of a reference signal from a local oscillator of a mobile station from the satellite position system signal; receiving a first cellular signal from a base station containing first and second timing markers; determining first and second time tags for the markers using the reference signal; and combining the frequency of the reference signal and the first and second time tags to compute a first frequency related to the base station.

9 Claims, 11 Drawing Sheets

METHODS AND APPARATUSES FOR MEASURING FREQUENCIES OF BASESTATIONS IN CELLULAR NETWORKS USING MOBILE GPS RECEIVERS

RELATED APPLICATION

This application is a divisional of U.S. patent application Ser. No. 10/189,044, filed on Jul. 2, 2002 now U.S. Pat. No. 6,937,872, this application also claims priority to U.S. Provisional Application No. 60/372,944, filed on Apr. 15, 2002.

FIELD OF THE INVENTION

The present invention relates to the field of cellular communication systems, and particularly to those systems where the location of a mobile cellular communication station (MS) is determined.

BACKGROUND OF THE INVENTION

To perform position location in cellular networks (e.g., a cellular telephone network), several approaches perform triangulation based upon the use of timing information sent between each of several basestations and a mobile device, such as a cellular telephone. In one approach, called Time Difference of Arrival (TDOA), the times of reception of a signal from a mobile device is measured at several basestations, and these times are transmitted to a location determination entity, called a location server, which computes the position of the mobile device using these times of reception. For this approach to work, the accurate positions of the basestations need to be known, and the times-of-day at these basestations need to be coordinated in order to provide an accurate measurement of the location. Time coordination is an operation to keep, at a particular instance of time, the times of day associated with multiple basestations within a specified error bound.

FIG. 1 shows an example of a TDOA system where the times of reception (TR1, TR2, and TR3) of the same signal from the mobile cellular telephone 111 are measured at cellular basestations 101, 103, and 105 and processed by a location server 115. The location server 115 is coupled to receive data from the basestations through the mobile switching center 113. The mobile switching center 113 provides signals (e.g., voice communications) to and from the land-line Public Switched Telephone System (PSTS) so that signals may be conveyed to and from the mobile telephone to other telephones (e.g., land-line phones on the PSTS or other mobile telephones). In some cases the location server may also communicate with the mobile switching center via a cellular link. The location server may also monitor emissions from several of the basestations in an effort to determine the relative timing of these emissions.

An alternative method, called Enhanced Observed Time Difference (EOTD) or Advanced Forward Link Trilateration (AFLT), measures at the mobile device the times of arrival of signals transmitted from each of several basestations. FIG. 1 applies to this case if the arrows of TR1, TR2, and TR3 are reversed. This timing data may then be used to compute the position of the mobile device. Such computation may be done at the mobile device itself, or at a location server if the timing information so obtained by the mobile device is transmitted to the location server via a communication link. Again, the times-of-day of the basestations must be coordinated, and their locations accurately assessed. In either approach, the locations of the basestations may be determined by standard surveying methods and be stored in the basestations, at the location server, or elsewhere in the network in some type of computer memory.

Yet a third method of doing position location involves the use in the mobile device of a receiver for the Global Positioning Satellite System (GPS) or other satellite positioning system (SPS). Such a method may be completely autonomous or may utilize the cellular network to provide assistance data or to share in the position calculation. Examples of such a method are described in U.S. Pat. No. 5,841,396; No. 5,945,944; and No. 5,812,087. As a shorthand, we call these various methods "SPS". In practical low-cost implementations, both the mobile cellular communications receiver and the SPS receiver are integrated into the same enclosure and, may in fact share common electronic circuitry.

A combination of either the EOTD or TDOA with an SPS system is called a "hybrid" system.

It should be clear from the above description that, for EOTD, TDOA, or hybrid systems, time coordination between the various cellular basestations is necessary for accurate position calculation of the mobile device. The required accuracy of the times-of-day at the basestations depends upon the details of the positioning method utilized.

In yet another variation of the above methods, the round trip delay (RTD) is found for signals that are sent from the basestation to the mobile device and then are returned. In a similar, but alternative, method the round trip delay is found for signals that are sent from the mobile device to the basestation and then returned. Each of these round-trip delays is divided by two to determine an estimate of the one-way time delay. Knowledge of the location of the basestation, plus a one-way delay constrains the location of the mobile device to a circle on the earth. Two such measurements then result in the intersection of two circles, which in turn constrains the location to two points on the earth. A third measurement (even an angle of arrival or cell sector) resolves the ambiguity. With the round trip delay approach, it is important that the RTD measurements be coordinated to be taken within several seconds, at worst, so that if the mobile device is moving rapidly, the measurements correspond to the mobile device being near the same location.

In many situations, it is not possible to perform round trip measurements to each of two or three basestations, but only to one basestation, which is the primary one communicating with the mobile device. For example, this is the case when the IS-95 North American CDMA cellular standard is used. Or it may not be possible to perform accurate (e.g., submicrosecond) round trip timing measurements at all due to equipment or signaling protocol limitations. This appears to be the case when the GSM cellular communication standard is used. In these cases, it is even more important that accurate timing (or relative timing) be maintained on the basestation transmissions if a triangulation operation is to be performed, since only the time differences between different mobile-basestation paths are utilized.

Another reason to maintain accurate timing information at basestations is to provide time to the mobile devices for aiding GPS based position calculations; and such information may result in reduced time to first fix, and/or improved sensitivity. U.S. Pat. No. 6,150,980 and No. 6,052,081 contain such examples. The required accuracy for these situations can range from a few microseconds to around 10 milliseconds, depending upon the performance improvement desired. In a hybrid system, the basestation timing serves the dual purpose of improving the TDOA (or EOTD) operation as well as the GPS operation.

The prior art approaches to basestation timing coordination employ special fixed location timing systems, termed Location Measurement Units (LMU) or Timing Measurement Units (TMU). These units typically include fixed location GPS receivers which enable the determination of accurate time-of-day. The location of the units may be surveyed, such as may be done with GPS based surveying equipment. In alternative implementations, the LMUs or TMUs may not rely upon an absolute time provided by a GPS receiver or other source, but may simply relate the timing of one basestation versus that of another basestation, in a differential sense. However, such an alternative approach (without using a GPS receiver) relies upon the observability of multiple basestations by a single entity. Furthermore, such an approach may give rise to cumulative errors across a network.

Typically, LMUs or TMUs observe the timing signals, such as framing markers, present within the cellular communication signals that are transmitted from the basestations and attempt to time-tag these timing signals with the local time found via a GPS set or other time determination device. Messages may subsequently be sent to the basestations (or other infrastructure components), which allow these entities to keep track of elapsed time. Then, upon command, or periodically, special messages may be sent over the cellular network to mobile devices served by the network indicating the time-of-day associated with the framing structure of the signal. This is particularly easy for a system such as GSM in which the total framing structure lasts over a period exceeding 3 hours. Note that the location measurement units may serve other purposes, such as acting as the location servers—that is, the LMUs may actually perform the time-of-arrival measurements from the mobile devices in order to determine the position of the mobile devices.

One problem with these LMU or TMU approach is that they require the construction of new special fixed equipment at each basestation or at other sites within communication range of several basestations. This can lead to very high costs for installation and maintenance.

SUMMARY OF THE INVENTION

Methods and apparatuses for frequency synchronizing basestations in a cellular communication system are described here.

In one aspect of the invention, a method to predict a timing of transmission of a basestation in a cellular communication system includes: receiving a first time tag for a first timing marker in a first cellular signal transmitted from the basestation; receiving a second time tag of a second timing marker in a second cellular signal transmitted from the basestation; and computing a frequency related to the basestation using the first and second time tags. Each of the time tags are determined using at least one satellite positioning system signal received at a mobile station, which also receives the corresponding time marker contained in the cellular signal from the basestation. In one example according to this aspect, the time tags are determined from the time-of-day messages in satellite positioning signals. In another example according to this aspect, the time difference between at least two time tags are determined from local reference signals, the frequencies of which are determined from the processing of satellite positioning signals.

In another aspect of the invention, a method to measure a frequency related to a basestation includes: receiving, at a mobile station, at least one satellite positioning system signal; determining a frequency of a reference signal from a local oscillator of the mobile station from the at least one satellite positioning system signal; receiving, at the mobile station, a cellular signal from the basestation, the cellular signal being modulated upon a carrier; measuring a frequency of the carrier using the reference signal from the local oscillator; and determining a frequency related to the basestation using the frequency of the carrier.

The present invention includes apparatuses which perform these methods, including data processing systems which perform these methods and machine readable media which when executed on data processing system cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
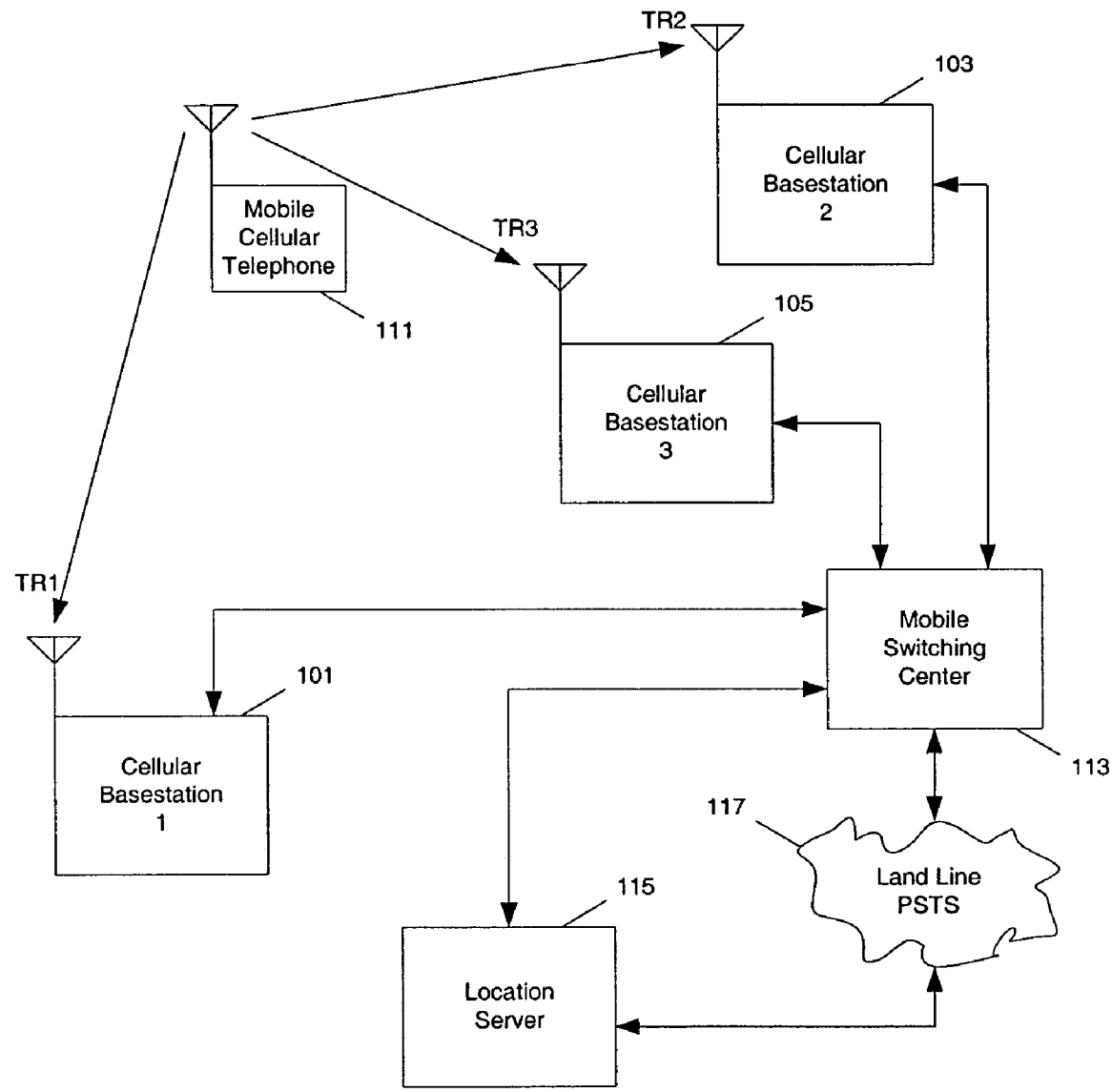
FIG. 1 shows an example of a prior art cellular network which determines the position of a mobile cellular device.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

In most digital cellular systems, numbered framing markers are transmitted as part of the cellular system transmissions. In a network such as GSM, the time-of-day information from a GPS receiver may be used to time tag the framing structure (e.g., framing markers) of the received communication (e.g., GSM) signal. For example, the start of a particular GSM frame boundary, which occurs every 4.6 milliseconds, may be used (see FIG. 7). There are 2,715,648 such frames per hyperframe, which last 3.48 hours; hence each such frame boundary is unambiguous for all practical purposes. Co-pending U.S. patent application Ser. No. 09/565,212, filed on May 4, 2000, describes a method for time coordination, in which mobile stations (MS) containing GPS receivers are utilized to measure both time-of-day and position to a high accuracy. The time tag information of the cellular framing structure measured at the mobile station is passed via normal cellular signaling to the basestation (BS) (e.g., a cellular basestation shown in FIG. 4), or other network entity (e.g., a server or a location server), to determine the time-of-day of the basestation. The delay due to the propagation time from the mobile station (MS) (e.g., the mobile cellular communication station shown in FIG. 2) to the basestation (BS) can be determined (typically at the basestation or other network entity) by dividing the BS-MS range by the speed of light, since the mobile station has determined its position via the GPS unit and the basestation knows its accurate location (e.g., via a survey). Then the basestation may determine the timing of its transmitted frame marker by simply subtracting the computed propagation time from the time tag of the framing marker provided by the mobile station.

Closely related to time coordination between basestations is frequency coordination (or synchronization) between basestations. Once established, it is desirable that coordination in time be maintained over a long period of time. Otherwise such time coordination would have to be performed often, which might be a complex and expensive operation. For example, basestations might coordinate their time by sending signals back and forth between themselves over existing communication channels (e.g., cellular channels). If such signaling is required on a continuous basis, valuable communication resources are wasted, which could otherwise be employed for transmitting other voice and data information.

To avoid frequent time coordination, it is desirable to have at each basestation an accurate measurement of the frequency of the primary signal source, or alternatively, the frequency of the basestation's source relative to those of other basestations. If the frequencies of the primary signal sources of the basestations are known to a high accuracy, the times of day at these basestations, once coordinated, can be maintained for a long period of time by utilizing time-interval counters.

At least one embodiment of the present invention seeks to perform frequency coordination between basestations. The methods according to the present invention utilize normal mobile cellular communication receivers that are equipped with GPS positioning capability, without deploying fixed and expensive network resources.

One embodiment of the present invention utilizes cellular transmission timing markers (e.g., framing markers) for frequency synchronization. Measurements of the basestation framing marker transmission frequencies is used to provide a precise estimate of the error between the optimal and the true timing between successive framing markers. This error may be propagated forward in time as a function of the marker number by utilizing a standard curve fit type algorithm. Thus, the frame marker times-of-occurrence may be used as an accurate clock for a long period of time once an initial frame marker timing is ascertained and a good estimate of the frame marker rate (or error from the nominal rate) is ascertained.

Another embodiment of the present invention utilizes the carrier frequency of cellular transmissions for frequency synchronization. In most cases both the framing markers and the carrier frequency of a cellular signal from a basestation are synchronized to the same reference signal generator at the basestation. Hence, by simple mathematical calculation, the frequency of the framing marker of a basestation signal can be ascertained from the carrier frequency of the cellular signal.

In at least one embodiment of the present invention, the frequency of the framing marker transmitted by the cellular basestation transmitter is determined for frequency coordination. However, the framing markers, and the signal symbols (assuming digital modulation), as well as the signal carrier frequency, are normally all synchronized to one common master oscillator (e.g., oscillator 413 in FIG. 4) in a digital cellular system. In several important cellular systems, including the GSM system, the Japanese PDC system and the WCDMA system, the frequency of the timing signals (e.g., framing marker) and the carrier frequency are derived from the same basic oscillator. Hence, precise measurements of either the rate of transmission of timing markers (the symbol rate) or the carrier frequency of such transmissions can be used to accomplish the same goal. The carrier frequency may be used to infer the frequency of transmission and vice versa. The advantages and disadvantages in measuring either of them are related to the details of the implementations and measurement accuracy.

In one embodiment, one or more mobile stations make one or more timing measurements of received basestation signals and transmit these time tags and optional additional information to a server, which in turn performs a frequency calculation.

In another embodiment, one or more mobile stations measure the carrier frequency of received basestation signals and transmit the information about the carrier frequency and optional additional information to a server.

In another embodiment, one or more mobile stations each makes at least two timing measurements for the received basestation signals, computes a frequency (or, equivalently a time interval) measure based upon these measurements, and transmits the frequency measure to a server.

In various embodiments, the server may collect a succession of data from the mobile stations to perform further processing for a better estimation of the frequency, or to perform a curve fit operation upon such frequency versus time information.

It will be appreciated that the cellular basestation transmission frequency may be computed at a basestation (BS), or at a mobile station (MS), or a server (e.g., a location server or other network entities).

Thus, to time synchronize basestations (equivalently, to determine the marker timings of emissions from these basestations), various methods according to the present invention determine the frequency of such emissions from the basestations, which can be an important part of the time synchronization problem, as described previously. The details of the methods are described below.

Figure 2:
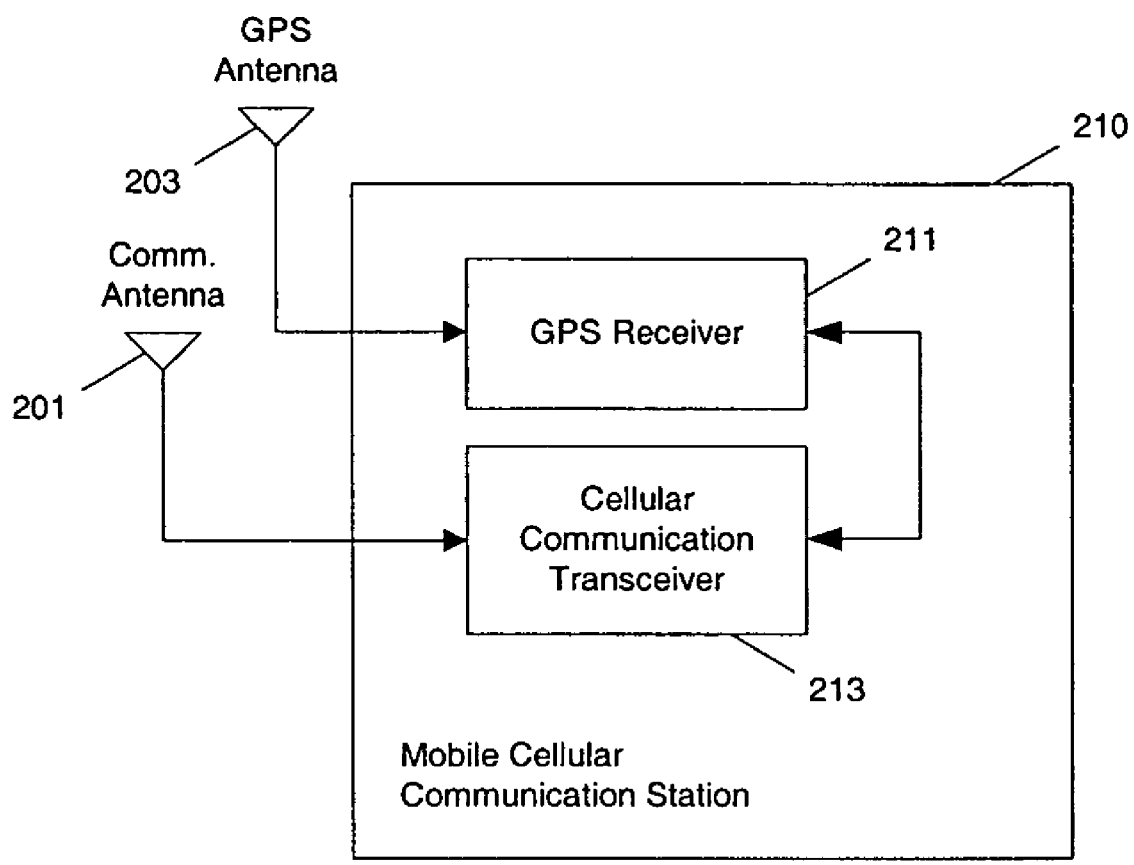
FIG. 2 shows an example of a mobile cellular communication station which may be used with the present invention and which includes a GPS receiver and a cellular communication transceiver.

FIG. 2 shows an example of a mobile station containing a GPS receiver, which may be used with the present invention. The GPS receiver can determine the, time-of-day at the instance of receiving a signal (e.g., a timing marker of a cellular signal received at transceiver 213) and the position of the receiver, as well as the frequency of an externally supplied signal, to a high accuracy. The measurements of the time-of-day, position, and frequency may be done in an autonomous mode if the level of the received signal is high, or with the aid of equipment in the infrastructure (servers) if the signal-to-noise ratio of the received signal is low (e.g., see U.S. Pat. No. 5,945,944; No. 5,841,396; and No. 5,812,087).

The mobile cellular communication station 210 shown in FIG. 2 includes a GPS receiver 211 connecting to a GPS antenna 203 and a cellular communication transceiver 213 connecting to a communication antenna 201. Alternatively, GPS receiver 211 may be contained within another chassis; in this situation, the station 210 does not include a GPS receiver nor does it require one, as long as the GPS receiver is coupled to and is co-located with the station 210.

The GPS receiver 211 may be a conventional, hardware correlator based GPS receiver, or it may be a matched filter based GPS receiver, or it may be a GPS receiver which uses a buffer to store digitized GPS signals which are processed with fast convolutions, or it may be a GPS receiver as described in U.S. Pat. No. 6,002,363 in which the components of the GPS receiver are shared with the components of the cellular communication transceiver (e.g., see FIG. 7B of U.S. Pat. No. 6,002,363 which is hereby incorporated here by reference).

The cellular communication transceiver 213 may be a modem cellular telephone which operates with any one of the well-known cellular standards, including: the GSM cellular standard, or the Japanese PDC communication standard, or the Japanese PHS communication standard, or the AMPS analog communication standard, or the North American IS-136 communication standard, or the unsynchronized wideband spread spectrum CDMA standard.

The GPS receiver 211 is coupled to the cellular communication transceiver 213 to provide GPS time and position in one embodiment to the cellular communication transceiver 213 (which then transmits this information to a basestation). In another embodiment, GPS receiver 211 provides aiding in the precise measurement of the carrier frequency of the cellular signal received by transceiver 213.

In one embodiment GPS time may be obtained at the mobile station 210 by reading GPS time off the GPS signals from the GPS satellites. Alternatively, a technique for determining time as described in U.S. Pat. No. 5,812,087 may be utilized. In this approach, a sample of the GPS signals received at the mobile may be transmitted to a location server or to some other servers where the signal sample is processed to determine the time of receipt as described in U.S. Pat. No. 5,812,087. Further, the time-of-day may be alternatively be computed using one of the various methods described in U.S. Pat. No. 6,215,442.

Furthermore, the cellular communication transceiver 213 may provide assistance data such as Doppler information or time information to the GPS receiver as described in U.S. Pat. No. 5,841,396, and No. 5,945,944. The coupling between the GPS receiver 211 and the cellular communication transceiver 213 may also be utilized to transmit a record of GPS data to or from a cellular basestation for the purpose of matching that record with another record in order to determine the time at the GPS receiver, as described in U.S. Pat. No. 5,812,087. In those situation or embodiments where a location server is used to provide assistance data to the mobile cellular communication station for the purpose of determining the position or time at the system 210, or a location server shares in the processing of information (e.g., the location server determines time or the final position calculation of the mobile system 210), it will be appreciated that a location server such as that shown in FIG. 5 and described further below is connected to a cellular basestation through a communication link to assist in the processing of data.

The position of the mobile station 210 is normally not fixed and is normally not predetermined.

Figure 3:
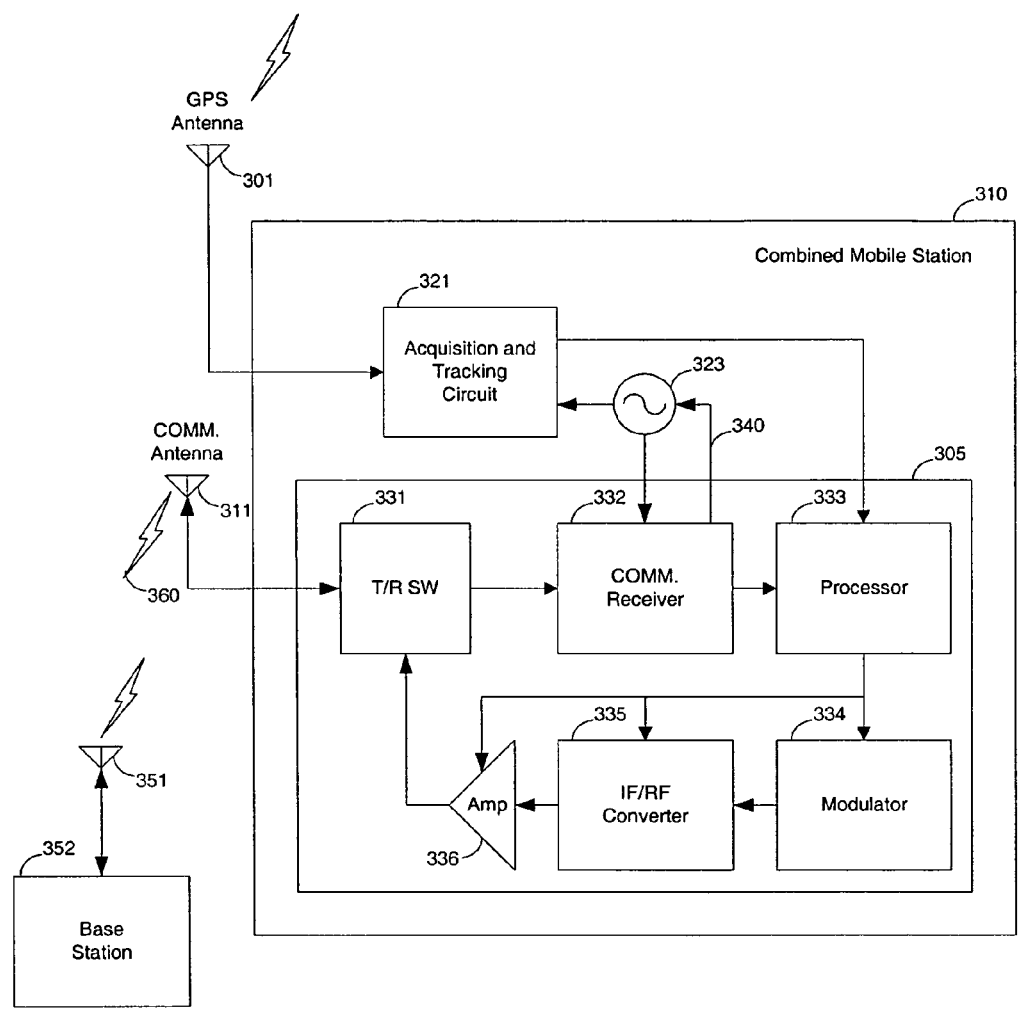
FIG. 3 shows a block diagram representation of a combined mobile station which may be used with the present invention and which shares the common circuitry between a GPS receiver and a cellular communication transceiver.

FIG. 3 shows a block diagram representation of a combined mobile station which may be used with the present invention and which shares the common circuitry between a GPS receiver and a cellular communication transceiver. The combined mobile station 310 includes circuitry for performing the functions required for processing GPS signals as well as the functions required for processing communication signals received through a cellular communication link 360 to or from a basestation 352.

Mobile station 310 is a combined GPS receiver and a cellular communication transceiver. Acquisition and tracking circuit 321 is coupled to GPS antenna 301, and communication transceiver 305 is coupled to communication antenna 311. Oscillator 323 provides reference signals to both circuit 321 and communication receiver 332. GPS signals are received through GPS antenna 301 and input to circuit 321 which acquires GPS signals received from various satellites. Processor 333 processes the data produced by circuit 321 for transmittal by transceiver 305. Communication transceiver 305 contains a transmit/receive switch 331 which routes communication signals (typically RF) to and from communication antenna 311. In some systems, a band splitting filter, or "duplexer," is used instead of the T/R switch. Received communication signals are input to communication transceiver 305 and passed to processor 333 for processing. Communication signals to be transmitted from processor 333 are propagated to modulator 334, frequency converter 335, and power amplifier 336. U.S. Pat. No. 5,874,914, hereby incorporated here by reference, describes details about combined mobile station that contains a GPS receiver and a cellular transceiver and utilizes a communication link.

The carrier frequency of a cellular signal from a basestation may be measured using a GPS receiver in a variety of ways. In one method, cellular receiver 332 frequency locks or phase locks to the received carrier from the basestation. This is typically done with the aid of a voltage controlled oscillator (VCO) (e.g., oscillator 323) in a phase-locked or frequency-locked loop configuration, which may be controlled by a signal from the communication receiver on line 340. The long term frequency of the VCO is then proportional to that of the basestation's transmitted carrier frequency (after removing a Doppler frequency offset due to the velocity of the mobile station). The VCO output may then be used as a frequency reference for the GPS receiver's downconverter circuitry (e.g., that used by acquisition and tracking circuit 321). As part of the signal processing in the GPS receiver, frequency errors are determined for the various received GPS signals received from several GPS satellites. Each such received signal will also contain a common component of such frequency errors due to the VCO error relative to an idealized value. This frequency error due to the VCO (a so-called "bias" frequency) may then be determined and scaled to determine the basestation frequency, after the Doppler induced frequency offset, due to the motion of the mobile station, is removed.

It is well known that such "common mode" frequency biases can be obtained in GPS processing. Received frequency errors are due to a combination of receiver motion and to the common mode bias. User motion is described by a three-component velocity vector. Hence, including the common mode bias, there are basically four frequency related unknowns for to be solved for. Signals received from four different GPS satellites will normally allow the solution of these four equations and hence the common mode bias error due to the VCO error. Performing multiple sets of frequency measurements over a period of time can further reduce the number of GPS satellite signals that must be received. Likewise, constraining the receiver velocity (e.g. assuming that there is little z-axis motion), can further reduce the number of required received satellite signals.

As an alternative to the above approach, a GPS receiver may have a reference signal that is independent from the VCO used by the cellular transceiver. In this case, the GPS receiver again determines the frequency of its reference signal (typically from a crystal oscillator). The output of the cellular transceiver VCO and the reference signal for the GPS receiver may both be sent to a frequency counting circuit, which determines, by means well-known in the art, the frequency ratio of the two reference signals. Since the frequency of the reference signal for the GPS receiver has been determined, the frequency of the cellular transceiver VCO can be determined from the frequency ratio. Since the VCO is phase or frequency locked to the carrier of the incoming basestation signal, the carrier frequency can then be determined from a simple scaling procedure. In order to eliminate the Doppler frequency offset due to the motion of the mobile station relative to the basestation, the location of the basestation is normally required in addition to the velocity of the mobile. A server that performs the final basestation frequency calculation normally knows the location of the basestation.

Figure 4:
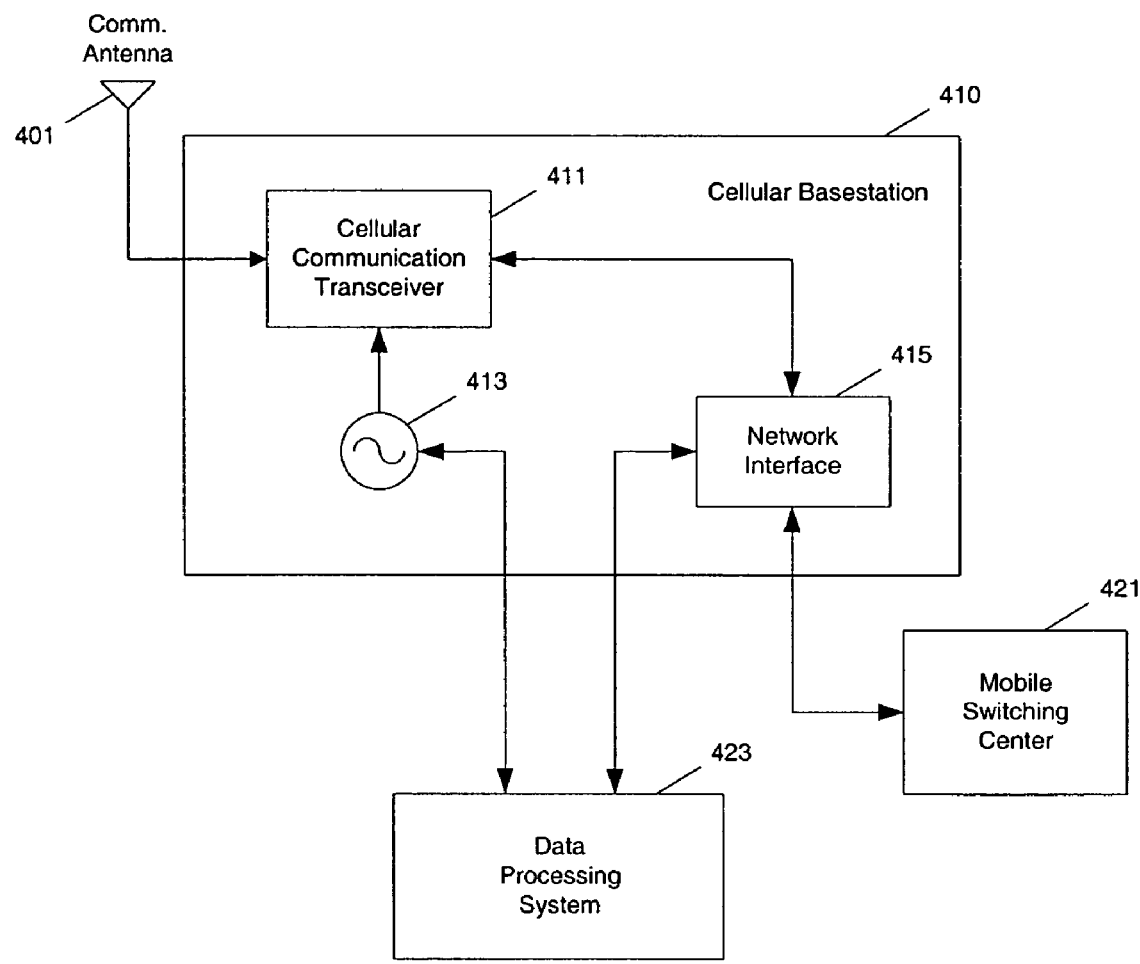
FIG. 4 shows an example of a cellular basestation which may be used in various embodiments of the present invention.

FIG. 4 shows an example of a cellular basestation which may be used with various embodiments of the present invention. The basestation 410 includes a cellular transceiver 411 which connects to at least one antenna 401 for communication signals to and from mobile cellular communication stations which are present in the area served by the cellular basestation 410. For example, mobile cellular communication stations 210 and 310 may be mobile stations served by the cellular basestation 410. The cellular transceiver 411 may be a conventional transceiver used to transmit and receive cellular signals, such as a GSM cellular signal or a CDMA cellular signal. Oscillator 413 may be a conventional system oscillator which controls the signal frequency of the basestation. The frequency of this oscillator may be measured according to methods of the present invention for frequency synchronization. In many cases oscillator 413 may be highly stable, but over a period of time, a small error in the frequency of the oscillator will cause the clock phase of the basestation to drift away from ideal by a large amount. A precise measurement of the frequency of the oscillator can be used to predict the error in the clock of the basestation and the error in the timing of the framing markers transmitted by the basestation. Cellular basestation 410 typically also includes a network interface 415 which transfers data to and from the cellular transceiver 411 in order to couple the cellular transceiver to a mobile switching center 421, as is well know in the art. The cellular basestation 410 may also include a co-located data processing system 423. Alternatively, data processing system 423 may be remote from the basestation 410. In some embodiments, the data processing system 423 couples to the oscillator 413 in order to adjust or recalibrate the time of the clock to thereby synchronize the clock to other clocks in other cellular basestations according to methods of described in the copending U.S. patent application Ser. No. 09/565,212, filed on May 4, 2000. In many cases the clock 413 is highly stable but freerunning and it would affect network operation to actually alter the time epochs of the clock. Instead the time associated with the clock epochs can be adjusted. This is which is meant by "recalibration." Hence, for the purpose of frequency synchronization, there may be no connection between the data processing system 423 and oscillator 413. The data processing system 423 is coupled to the network interface 415 in order to receive data from the cellular transceiver 411, such as time tag information for the frame markers measured by the mobile systems for the purpose of synchronization to other cellular basestations, or for computing the frequency of transmission of framing markers. In practice a basestation may comprise a physical tower structure, one or more antennas and a set of electronics.

Figure 5:
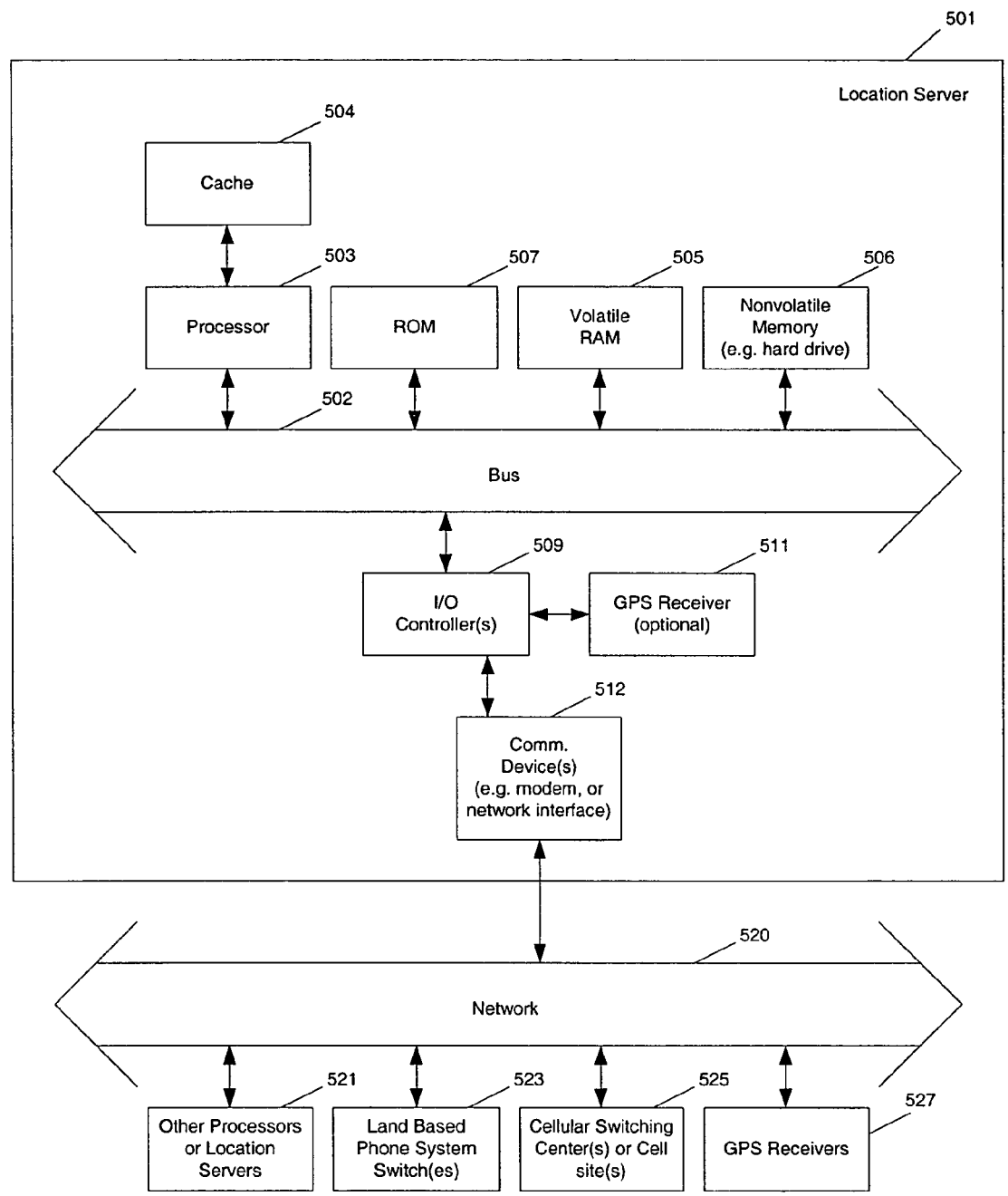
FIG. 5 shows an example of a server which may be used with the present invention.

FIG. 5 shows an example of a data processing system which may be used as a server in various embodiments of the present invention. For example, as described in U.S. Pat. No. 5,841,396, the server may provide assistance data such as Doppler or other satellite assistance data to the GPS receiver in the mobile station 210. In addition, or alternatively, the location server may perform the final position calculation rather than the mobile station 210 (after receiving pseudoranges or other data from which pseudoranges can be determined from the mobile station) and then may forward this position determination to the basestation so that the basestation may calculate the frequency. Alternatively, the frequency may be calculated at the location server, or at other servers, or at other basestations. The data processing system as a location server typically includes communication devices 512, such as modems or network interface, and is optionally coupled to a co-located GPS receiver 511. The location server may be coupled to a number of different networks through communication devices 512 (e.g., modems or other network interfaces). Such networks include the cellular switching center or multiple cellular switching centers 525, the land based phone system switches 523, cellular basestations, other GPS signal sources 527, or other processors of other location servers 521.

Multiple cellular basestations are typically arranged to cover a geographical area with radio coverage, and these different basestations are coupled to at least one mobile switching center, as is well known in the prior art (e.g., see FIG. 1). Thus, multiple instances of basestation 410 would be geographically distributed but coupled together by a mobile switching center. The network 520 may be connected to a network of reference GPS receivers which provide differential GPS information and may also provide GPS ephemeris data for use in calculating the position of mobile systems. The network is coupled through the modem or other communication interface to the processor 503. The network 520 may be connected to other computers or network components such as the data processing system 423 in FIG. 4 (through an optional interconnection not shown in FIG. 4). Also network 520 may be connected to computer systems operated by emergency operators, such as the Public Safety Answering Points which respond to 911 telephone calls. Various examples of method for using a location server have been described in numerous U.S. patents, including: U.S. Pat. No. 5,841,396; No. 5,874,914; No. 5,812,087; and No. 6,215,442, all of which are hereby incorporated here by reference.

The location server 501, which is a form of a data processing system, includes a bus 502 which is coupled to a microprocessor 503 and a ROM 307 and volatile RAM 505 and a non-volatile memory 506. The microprocessor 503 is coupled to cache memory 504 as shown in the example of FIG. 5. The bus 502 interconnects these various components together. While FIG. 5 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 502 may include one or more buses connected to each other through various bridges, controllers and/or adapters as is well known in the art. In many situations the location server may perform its operations automatically without human assistance. In some designs where human interaction is required, the I/O controller 509 may communicate with displays, keyboards, and other I/O devices.

Note that while FIG. 5 illustrates various components of a data processing system, it is not intended to represent any particular architecture or manner of interconnecting the components as such details are not germane to the present invention. It will also be appreciated that network computers and other data processing systems which have fewer components or perhaps more components may also be used with the present invention.

It will be apparent from this description that aspects of the present invention may be embodied, at least in part, in software. That is, the techniques may be carried out in a computer system or other data processing system in response to its processor executing sequences of instructions contained in memory, such as ROM 507, volatile RAM 505, non-volatile memory 506, cache 504 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processor 503.

In some embodiments the methods of the present invention may be performed on computer systems which are simultaneously used for other functions, such as cellular switching, messaging services, etc. In these cases, some or all of the hardware of FIG. 5 would be shared for several functions.

Figure 6:
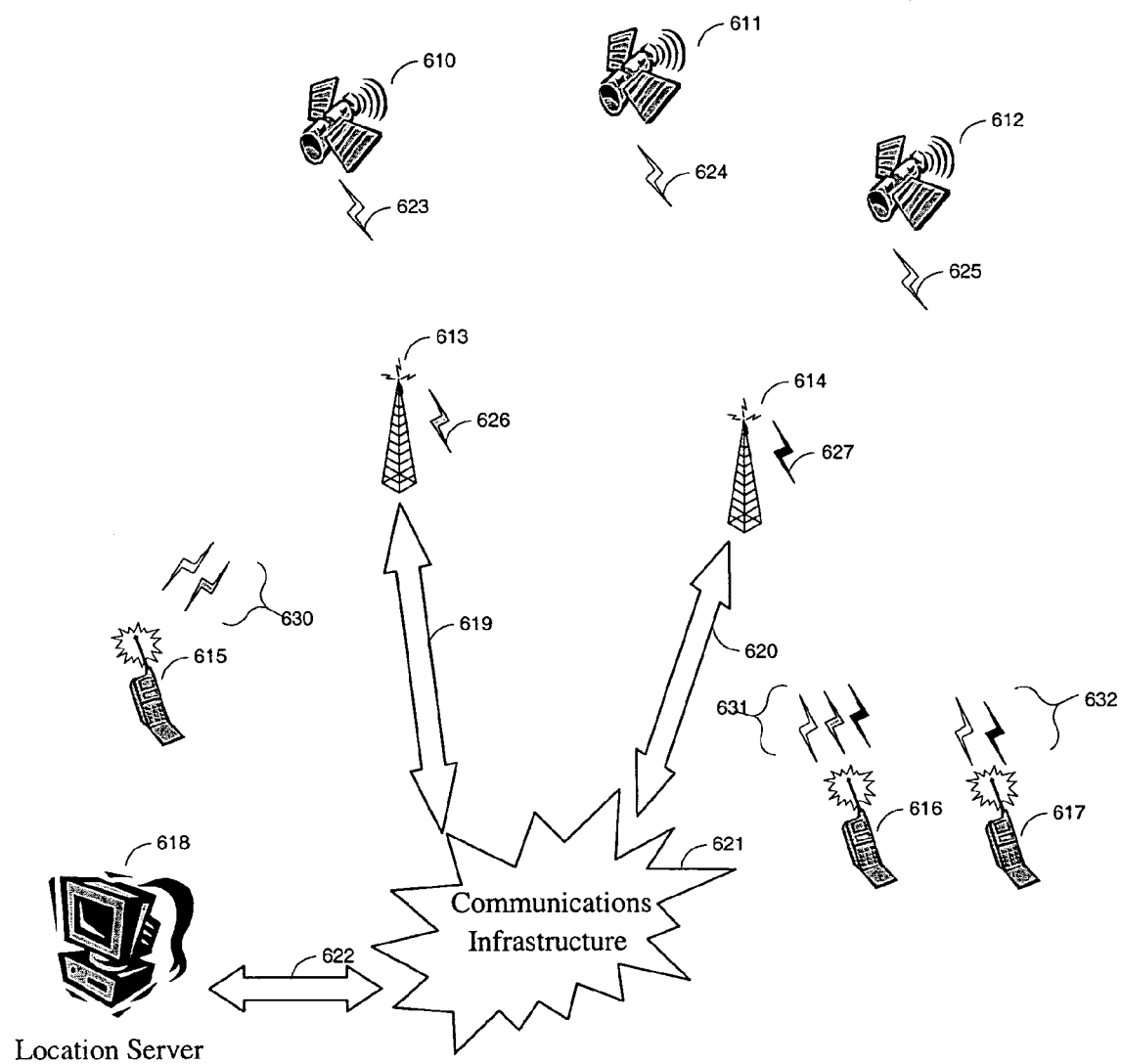
FIG. 6 illustrates a network topology for measuring frequencies of basestation signals according to one embodiment of the present invention.

FIG. 6 shows a general system topology which may be used with this invention. The figure is very simplified for exemplary purposes; however, it illustrates a number of different situations that may be used in practice.

There are illustrated in FIG. 6 three mobile stations (615, 616, and 617), two cellular basestations (613 and 614), a three satellite GPS constellation (610, 611, and 612), and one location server 618.

Location server 618 communicates with other infrastructure via a (typically) wireline link 622, cellular infrastructure links 619 and 620 (typically wireline), and a communication infrastructure 621 (typically wireline). The emissions from the GPS satellites 623–625, are illustrated as with no fill. Those from basestation 613 have shading (e.g., 626); and those from basestation 614 have a solid fill (e.g., 627). The reception of signals by the mobile stations (with SPS receivers) follows the same coding scheme. Thus, it is seen in FIG. 6 that MS 615 receives signals from the GPS satellites and from BS 613; MS 616 receives signals from the GPS satellites and from both BS 613 and BS 614; and MS 617 receives signals from the GPS satellites and BS 614.

For simplicity all mobile stations receive signals from all GPS satellites, although this is not necessary in practice. In practice, there may be a multiplicity of location servers, many more basestations and mobile stations; and each individual mobile station may observe emissions from more than two basestations. Also, location servers may be co-located with the basestations or be remote from the basestation (as illustrated in FIG. 6).

In the example of FIG. 6 mobile station 616 would normally perform two-way communications with only one of the basestations from which it receives signals. For example, MS 616 may be performing two-way communications with basestation 613 and yet it may still receive emissions from both basestations 613 and 614. Thus, MS 616 in this case may perform synchronizing operations upon both basestations 613 and 614, although in this example, it would communicate synchronization information only to basestation 613. It is well known in the art that cellular telephones monitor other basestation emissions, in addition to a primary or "serving" site, in order to prepare for future communications, or "handoffs", to a different basestation.

FIG. 6 also shows a location server that may communicate data to and from mobile stations via a communication infrastructure and the cellular infrastructure. The location server may be located at a basestation, but typically is remote from the basestations, and in fact may communicate with a number of basestations. The synchronization information provided by the mobile stations would typically be sent to one or more location servers, which would process such information and determine the relative or absolute timing of the transmissions of the basestations.

Figure 7:
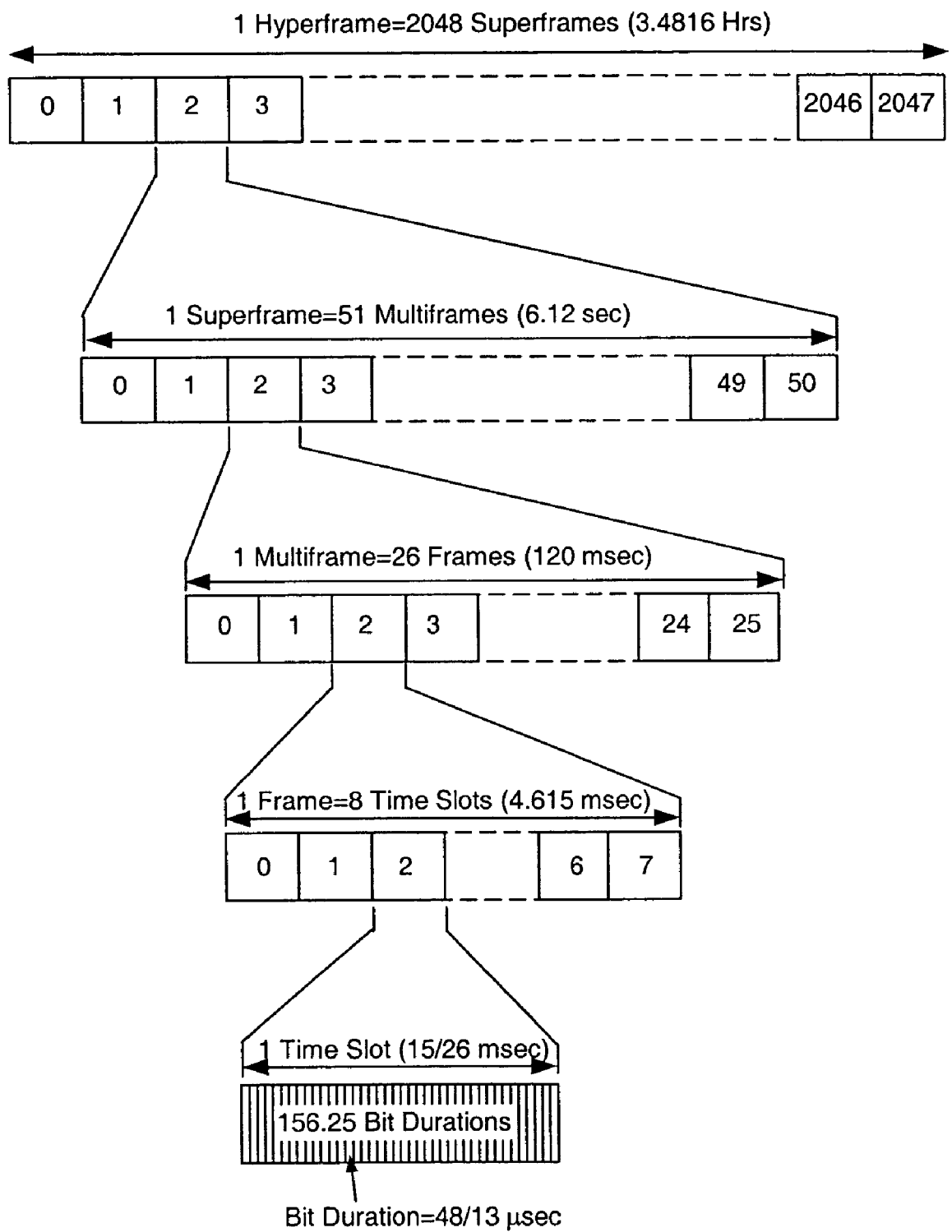
FIG. 7 shows the framing structure of GSM cellular signals.

FIG. 7 shows the framing structure of traffic channels of GSM cellular signals. In a GSM traffic signal, a superframe occurs every 6.12 seconds; and a hyperframe occurs every 2048 superframes, or every 3.4816 hours. Hence, the superframe is a useful epoch of granularity for time interval measurement. Alternatively, integral numbers of frames, multiframes, etc. may be used, since the times of their occurrence are uniquely defined as a multiple of bit durations.

In one embodiment of this invention, the duration of transmission is measured between two framing markers contained within a cellular communication signal transmitted by a cellular basestation. A set of measurements is made by one or more mobile stations to determine the duration, i.e., timing of a later framing marker with respect to an earlier frame marker. The measured duration is compared (typically by a server) to an expected timing. The result is used to determine the error in the frequency of the basestation oscillator versus a desired value.

The error in measurement may be specified as a fraction of the true value, and be expressed in terms of parts per million (PPM). For example, if the time between specific framing markers is designed to be 1 second but measured to be 1 second plus 1 microsecond, the error can be expressed as 1 microsecond/1 second=1 PPM. This is the convenient way to specify the error, since it also applies to the error of other synchronized epochs (e.g., bit rate) as well as the error in carrier frequency of the basestation, assuming (as is usually the case) that the transmitted carrier frequency is synchronized to the framing markers.

Suppose one or more mobile stations measure the duration of a basestation signal corresponding to 98 transmitted superframes, approximately 10 minutes in time. The specific time of measurement can be that corresponding to the beginning of a numbered multiframe. The mobile station keeps track unambiguously of the multiframe number by means of signaling information carried within the baseband transmissions. Hence, the ideal period of measurement is exactly known, as expressed in units of transmitted bit duration (a bit period equals $48/13$ microseconds). The ideal measurement period is 98 times the ideal period of each superframe, i.e., 599.76 seconds. However, the actual time measurement is influenced by errors in the transmitter's clock, and by various measurement related errors.

When the duration between the two predetermined framing markers, lasting for about 600 seconds, is measured with an error less than 1 microsecond, the error in measured frequency of transmission of the framing markers is less than 0.00167 PPM. This precision is very consistent with the short term and long term frequency stability of ovenized crystal oscillators, which are commonly in use in cellular basestations, even though the absolute accuracy of such oscillators is often much poorer. In fact, in many cases the framing marker frequency may be measured to a much greater precision. Although the maximum absolute error in the frequency of GSM basestation reference oscillators has a specification of 0.05 PPM, the stability of these oscillations is typically much better than this specification.

The duration to be measured may be extended to over a period of even hours to achieve a better accuracy in measurement, assuming that the short term stability of the basestation oscillator supports such accuracy and that longer term drift characteristics (e.g., those due to aging) follow a smooth curve. As an example, a measurement period extended to one hour with 1 microsecond precision implies that a frequency accuracy of 0.000278 PPM, which is again consistent with short term stability of good quality ovenized crystal oscillators. In fact it is common that the precision of good quality crystal oscillators is ten times better than this.

Thus, measuring the duration of the period of transmission between two framing markers using a mobile station can provide a very accurate measurement of the frequency of transmission of framing markers, which may be related to the frequency of the oscillator of the basestation.

Figure 8:
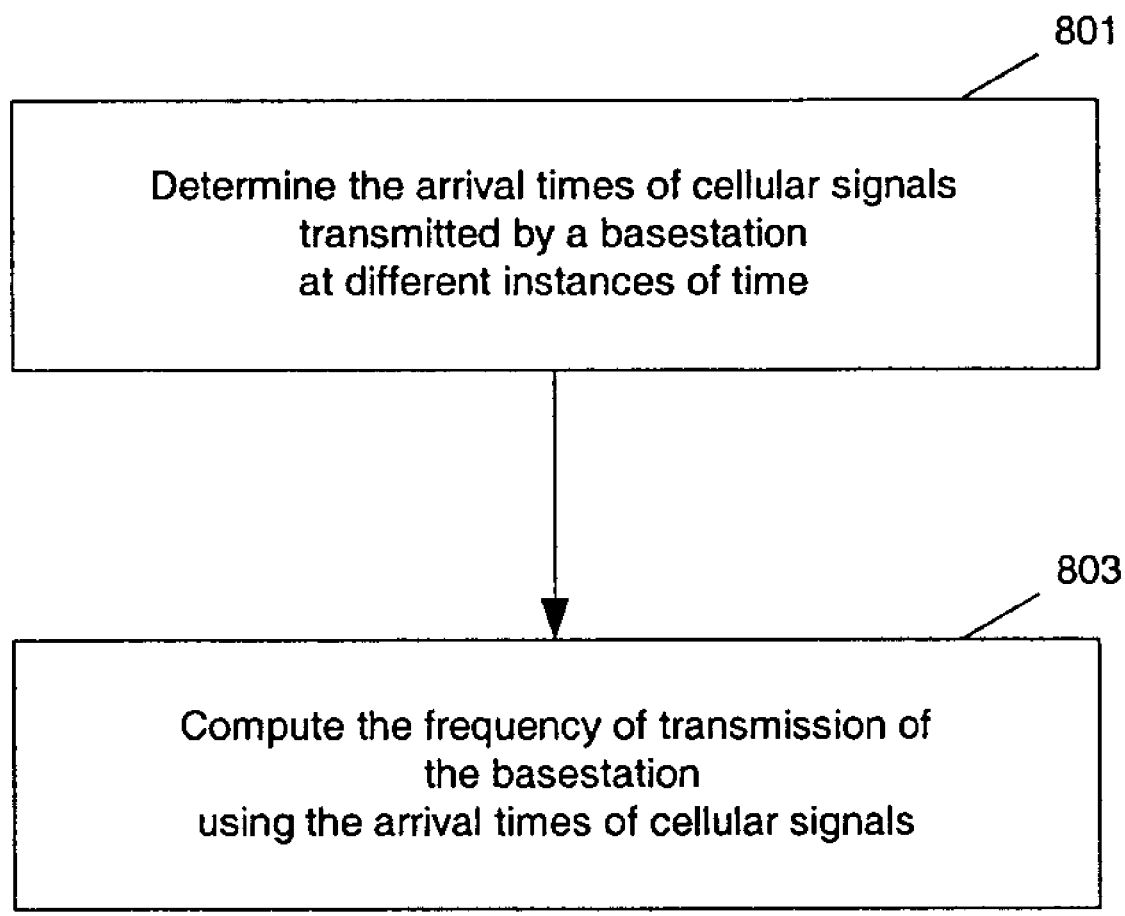
FIG. 8 shows a flow chart for determining a frequency of a basestation according to one embodiment of the present invention.

FIG. 8 shows a flow chart for determining a frequency of a basestation's transmissions according to one embodiment of the present invention. In operation 801, the arrival times of cellular signals transmitted by a basestation are measured at difference instances of time. The arrival times of framing markers (e.g., boundaries of certain frames) are measured using one or more mobile stations (e.g., MS 210, MS 310, or MS 615–617) with GPS receivers. Then, the frequency of transmission of the basestation can be computed using the arrival times of these cellular signals. The framing marker frequency can be calculated by dividing the known numbers of framing markers present in the duration by the duration. Since the carrier frequency of the basestation signal and the frequency of transmission of framing markers are synchronized to the frequency of the main oscillator of the basestation, the frequency of the main oscillator of the basestation and the carrier frequency of the basestation signal can be determined. In some embodiments it may be computationally more convenient to compute the period of transmission from the basestation.

As stated earlier, the determination of cellular transmitter frequency would typically be done at a server, or so-called Position Determination Entity (PDE), rather than at a cellular basestation, although the PDE may be collocated with the cellular basestation. This server or PDE is a set of equipment that resides in the cellular or communication network infrastructure which may pass messages to and from the mobile stations via communication networking, cellular networking and wireless links. That is, once the mobiles make timing related measurements of the basestation transmissions, such measurements are transmitted over the cellular link to a serving basestation and then via infrastructure land lines to the PDE. The PDE would then utilize these measurements to compute the time and frequency associated with future framing markers. This information may then be passed to the mobiles or to other network entities wishing to utilize such information to improve system performance. In fact, in one embodiment, such timing information acts as assistance data that allows the mobile stations to perform future GPS reception and measurement operations in a more efficient manner. This embodiment then provides a "bootstrap" approach where prior GPS measurement performed by some mobiles greatly aid the performance of later GPS measurements. Performance enhancements in this manner include greatly increased sensitivity, reduced time to first fix, and increased availability, as described in U.S. Pat. No. 5,841,396, and No. 5,945,944.

Figure 9:
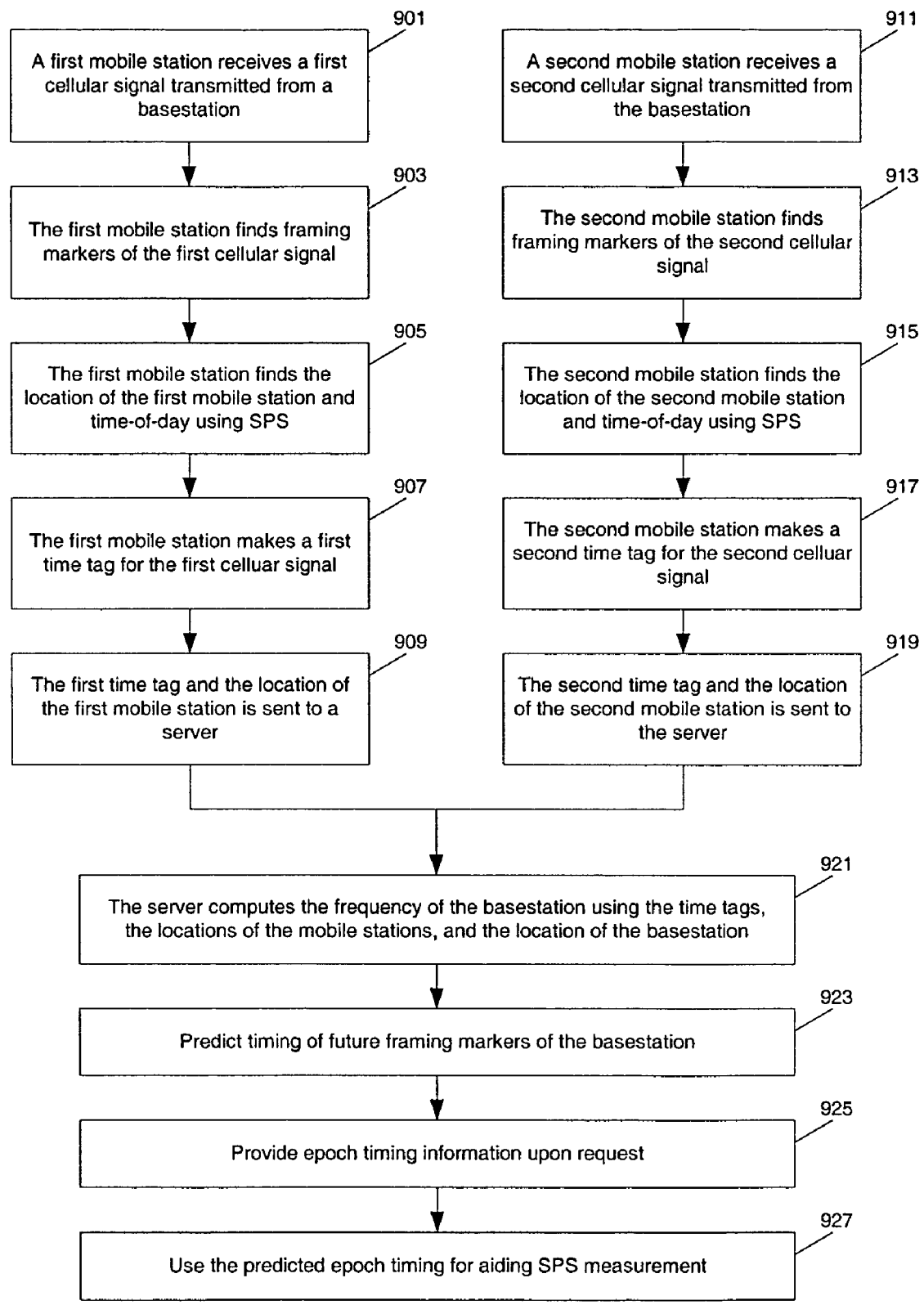
FIG. 9 shows a detailed method to determine a frequency of basestation signals by using measurements of framing epochs of the basestation signals according to one embodiment of the present invention.

FIG. 9 shows a detailed method to determine a frequency of basestation signals by using measurements of framing epochs of the basestation signals according to one embodiment of the present invention. In operation 901–909, a first mobile station (MS) receives a cellular signal from a basestation (BS); finds a framing marker contained within such cellular signal; finds the time of day and its own location using its GPS receiver; assigns a time tag to the framing markers using the time-of-day found in operation 905; and sends its location (or information for the determination of its location) and the time tags (or information for the determination of the time tags) to a server, such as a location server.

It will be appreciated that operation 905 may precede operations 901 and 903, or be concurrent with operations 901 and 903. The transmission path for sending the location and time tag information typically includes a cellular link followed by additional terrestrial links (e.g., telephone lines, local area networks, etc).

The cellular signal received in operation 901 may be over a different communication link than that used to transmit the data in operation 909. That is, the basestation observed in operation 901 may not be the "serving" basestation for the mobile station. It may be one that the mobile station briefly observes to determine a "neighbor" list of basestations, which might be used at a later time during a handoff operation. It is often the case that a mobile station may observe as many as 10 basestations or more, as is well known in the art.

A second mobile station (or even the same basestation) performs operations 911–919 in a manner similar to operations 901–909. Typically, operations 911–919 are performed at a different instance of time other than when operations 901–909 are performed. It will be appreciated that operations 911–919 may be performed by the same mobile station that performed operation 901–909, but at a different instance of time.

In operation 921, the server (e.g., a location server) processes the time tags received from the mobile stations, the locations of the mobile stations, and the information about the basestation location to compute a frequency related to the basestation, such as a frequency associated with the framing marker rate or any other frequencies of the basestation that are synchronized to this rate. The frequency may be expressed in terms of a nominal (ideal or theoretical) frequency and an error, with the latter expressed in dimensionless PPM units, for example. Since the time tags correspond to the instances of times when the framing markers arrived at the measuring mobile station (or stations), the locations of the mobile stations and the basestation are needed to convert the time tags into time measures at a same location in order to compute a precise duration of the transmission. This is done by subtracting from the time tags the delays for the cellular signal to travel from the transmitting basestation to the measuring mobile stations.

In operation 923, the times-of-occurrence of future basestation framing markers can be predicated using the measured frequency of transmission. Such predictions may be transmitted to various network entities such as basestations or mobile stations upon request in operation 925.

Since the information provided to the server in operations 909 and 919 also allows the determination of the time-of-day associated with the framing markers, time coordination may also be performed according to the methods described in the co-pending U.S. patent application Ser. No. 09/565,212, filed on May 4, 2000.

In operation 927, the predicted epoch timing can be used by mobile stations or basestations for aiding SPS measurements or TDOA or EOTD operations.

While the FIG. 9 illustrated a method to determine the frequency of transmission of a basestation using two mobile stations and one basestation, in practice, there may typically be many more mobile stations involved. In addition, each mobile station may simultaneously or sequentially view the timing epochs of several basestations. Hence, multiple operations like operations 901–909 (or 911–919) may take place in parallel corresponding to multiple basestations. The processing as shown in FIG. 9 may proceed on a continuing basis. As mentioned earlier, the operations of FIG. 9 may be carried out by a single mobile station observing one or more basestations.

The errors in the epoch predictions may be reduced by modeling the long term frequency versus time (drift) characteristics of the basestation. In many situations the long term drift is smooth and fairly predictable for good quality basestation oscillators. Thus, the drift characteristics can be determined from multiple measurements of basestation transmissions over very long periods of time. A curve fitting procedure can be used to predict future drifts from the drift characteristics. Typical curve fitting algorithms may use polynomials.

In the method as shown in FIG. 9, it is not necessary that the same mobile station make the subsequent timing measurements. In fact, each of the timing measurements, corresponding to a given basestation, may be made by different mobile stations. When a large number of measurements are made over a period of time, various averaging operations, such as least-mean square (LMS) averaging, may be performed. Processing a large number of measurements not only reduces the measurement error significantly, but also permits the discarding of measurements which may contain unusually high errors due to spurious effects, such as multipath reception of the basestation transmissions. Such discarding of "outliers" may be done by first making an initial estimate of the frequency using all measurements, then discarding those measurements that appear to be well off this initial measurement, and finally re-computing the estimate using the measurements that have not been discarded. Other approaches, such as those using order statistics, may also be used to discard outliners.

The cellular signal arriving at a mobile station may be a result of reflection of the primary signal or the presence of multiple direct and reflected received signals, so-called "multipath". In most cases, multipath results in a positive excess delay, i.e., a longer delay in signal transmission than that in a direct line-of-sight transmission. The delay for line-of-sight transmission can be determined by dividing the distance between the basestation and mobile station by the speed of light. Since it is rare that multipath produces a negative excess delay, simple averaging may not be the best approach to reduce the error due to multipath.

The excess delay due to multipath may be compensated by using weighted averaging. One method is to select, or heavily weight, the measurements that are derived from high quality signals, for example, signals of high strength (high signal-to-noise ratios) and signals with narrow, well-defined signal shapes. Some type of autocorrelation analysis to analyze the received signal shape may be used to determine the quality of the received signal. High quality signals tend to result more often from line-of-sight transmission, or from situations with minimal reflections, and hence exhibit less excess delays than low quality signals. In some situations, with a sufficiently high received signal level, it is possible to utilize signal processing algorithms to estimate the number, strengths, and relative delays of the received signals from a given basestation. In this case the smallest delay may be chosen in order to minimize the effect of excess delay.

Figure 10:
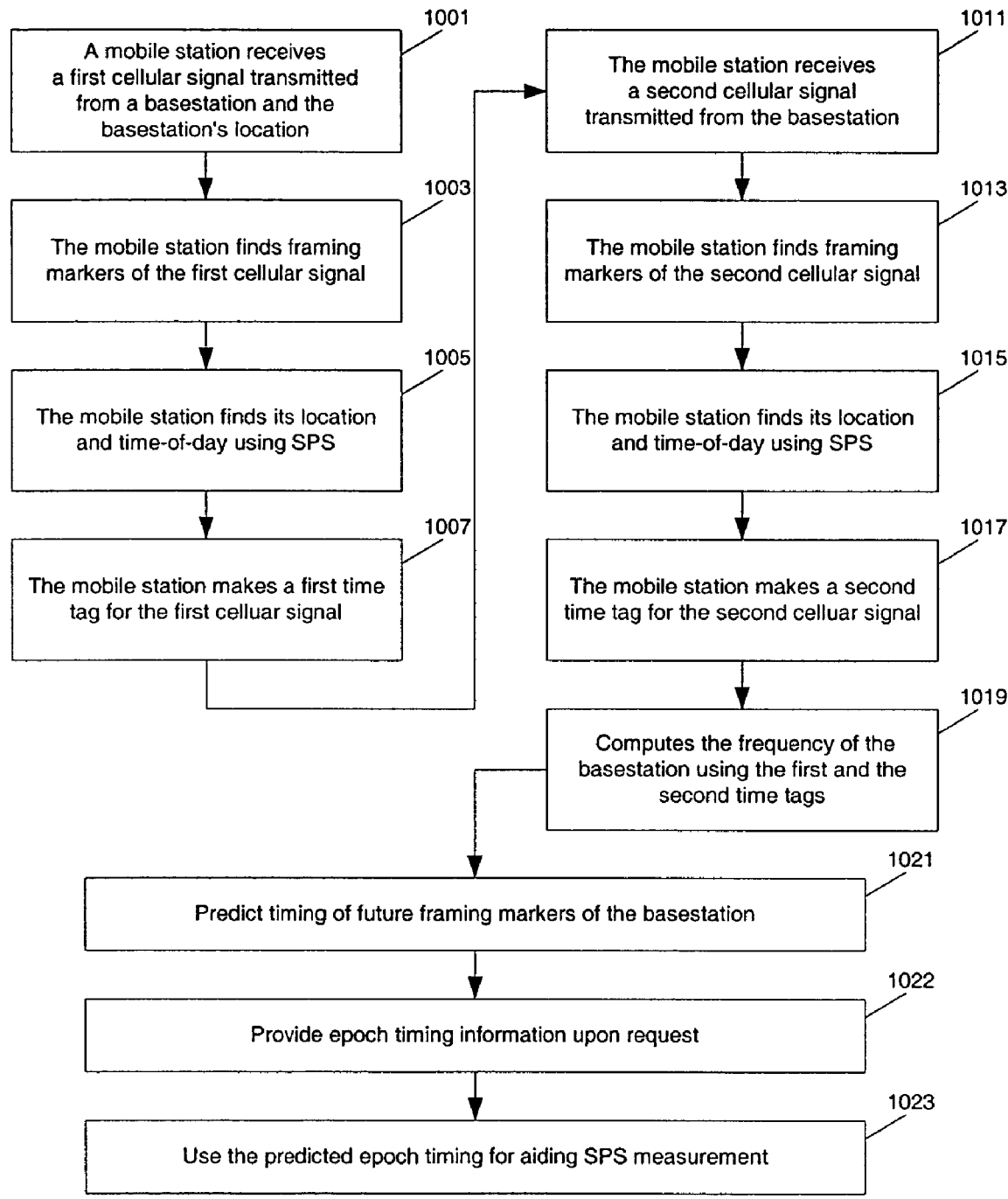
FIG. 10 shows another method to determine a frequency of basestation signals by using measurements of framing epochs of the basestation signals according to one embodiment of the present invention.

While FIG. 9 illustrates a method where the duration of transmission is computed at a server, FIG. 10 shows another method where the duration of transmission is determined at a mobile station. In operations 1001–1007, a mobile station receives a cellular signal from a basestation (BS) and the BS location; finds a framing marker contained within such cellular signal; finds its location and the time of day using its GPS receiver; and assigns a time tag to the framing markers using the time-of-day found in operation 1005. Similarly, a time tag for a second framing marker is determined in operations 1011–1017. In operation 1019, the mobile station computes the duration of the transmission time using the time tags. In this case, information about the position of the mobile station and the basestation are typically required, since the mobile station may have moved between measurements and hence the change in basestation-mobile range must be compensated. If it is known that the mobile is stationary, then this information is not required. The frequency of transmission of framing markers for the basestation can be determined and can be used to predict the timing of future framing markers of the basestation. The duration or the measured frequency may be transmitted to a server, and the prediction of the timing may be performed on a server. In operations 1022 and 1023, the prediction can be provided to mobile stations or basestations for aiding in SPS measurement, or in EOTD or TDOA operations. The first and second cellular signals in FIG. 10 typically correspond to two portions of the cellular signal received at different times during the same telephone "call". However, these may also correspond to signals from the basestation received during separate calls.

Figure 11:
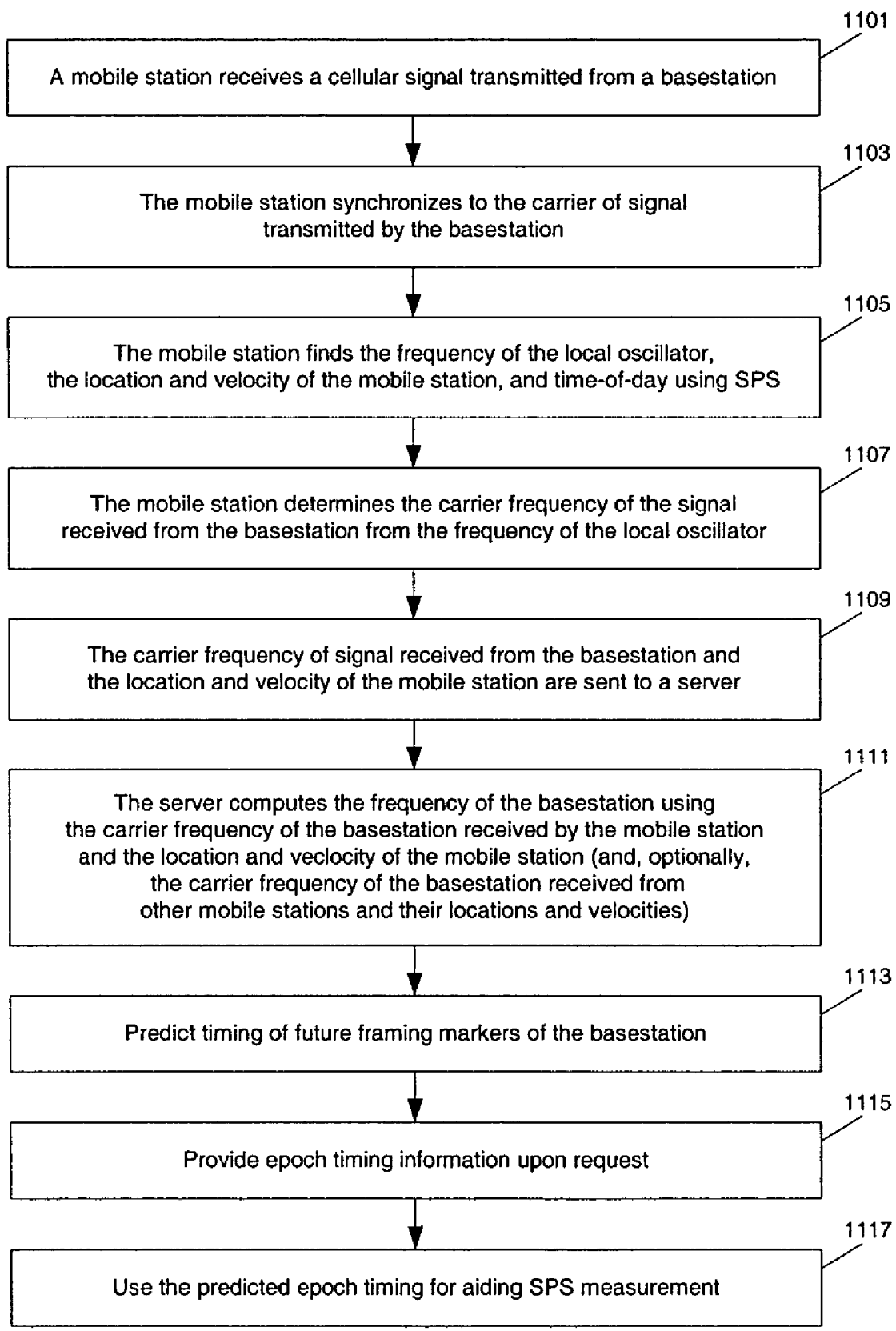
FIG. 11 shows a detailed method to determine a frequency of basestation signals by using measurements of carrier frequency of the basestation signals according to one embodiment of the present invention.

FIG. 11 shows a detailed method to determine a frequency of basestation signals by using measurements of carrier frequency of the basestation signals according to one embodiment of the present invention. In operation 1101, a mobile station receives a cellular signal transmitted from a basestation. It synchronizes to the carrier frequency of the received cellular signal in operation 1103. This is normally done using either a Phase-Locked Loop (PLL) or Automatic Frequency Control (AFC) circuit, either of which contains a voltage-controlled oscillator (e.g., VCO 323). The synchronization procedure causes the VCO to bear a proportional relationship to either the phase or frequency of the received carrier.

In operation 1105 the mobile station uses a GPS (or SPS) receiver to determine its location, velocity, the time-of-day, and the frequency of the reference signal from its local oscillator. For the determination of a frequency of the basestation, the measurement of the frequency of the local oscillator reference is the primary information of interest; however the location, velocity and time-of-day information are typical byproducts of the GPS processing. The location and velocity are required to determine the effect of the MS motion on the frequency measurement. As discussed previously, the local reference signal used by the GPS receiver may be provided by the VCO of the cellular transceiver or may be provided by a separate crystal oscillator.

In operation 1107 the mobile station determines the received basestation carrier frequency from the VCO signal and from the GPS reference frequency measurement. As described earlier, this is a direct byproduct of the GPS processing if the VCO is used as its frequency reference. Alternatively, separate frequency counting circuitry may be utilized to determine the frequency ratio of the VCO and GPS reference signals. The frequency ratio and the value of the GPS reference frequency, determined while processing GPS signals, provide a precise estimate of the VCO frequency and hence the carrier frequency of the received basestation signal.

In operation 1109, the frequency information is sent, with the auxiliary data (e.g., time-of-day, basestation identity information, and others) to a server. In operation 1111, the carrier frequency information, which may be expressed in PPM units or other units, may be used to compute the basestation oscillator frequency, and/or other frequencies (e.g., framing mark frequency). The location and velocity of the mobile are used together with the basestation location to determine the frequency error due to the mobile-basestation relative motion. This error must be removed in order to get an accurate estimate of the frequency of the basestation. The server might combine a number of such frequency measurements together to further improve the estimate of basestation frequency. Finally, in operations 1113–1117, the server predicts the timing of future basestation marker epochs from this frequency information and sends it to other network elements (e.g., mobile stations, or basestations, or location servers) upon request for aiding measurements (e.g., SPS measurements, or TDOA or EOTD operations).

While FIG. 11 illustrations a scenario involving only a mobile station and a basestation, in practice, there may be many more mobile stations involved. Each mobile station may simultaneously or sequentially view the transmissions of several basestations. Hence, multiple sequences of operations (as operations 1101–1109) may take place in parallel corresponding to multiple basestations. It will also be appreciated that the processing as shown in FIG. 11 may proceed on a continuing basis.

A number of other variations to the methods of FIGS. 8–11 should be apparent to those skilled in the art. For example, the mobile station may perform the calculations 1111–1117 if it receives the location of the basestation. In FIG. 10 instead of measuring time-of-day in operations 1005 and 1015, the mobile may compute the elapsed time after it has calibrated its clock via the method of 1101–1107 of FIG. 11.

When the basestation oscillator is sufficiently stable, the basestation frequency calibration can allow the accurate prediction of epochs of future timing markers transmitted by the basestation. Typically, the stability of basestation oscillator is sufficient to allow accurate timing predictions over very long periods of time, once a time coordination is performed.

The basestations typically utilize high quality ovenized crystal oscillators as frequency references. Some basestations further lock their references to transmitted signals from GPS satellites, in which case the long term stability of the basestation transmissions would be locked to Cesium type stability, and be suitable for accurate timing predictions. In the following discussions, we assume that such GPS locking is not utilized. In this case the two major sources of basestation oscillator instability are: i) short term frequency instability which is usually characterized by short term frequency stability measures such as noise spectral density methods or Allan Variance; and ii) longer term frequency drift which is typically associated with aging effects. Long term frequency drift tends to be on the order of 0.001 PPM per day or better and hence should not represent a significant source of error over relatively short periods of time (e.g., 15 to 30 minutes).

Most basestation oscillators utilize ovenized crystal oscillators. Small changes in temperature of the oven or voltage supplied to the oven can contribute to increases in frequency error. In addition certain short term frequency stability characteristics, such as Random-walk frequency effects, produce a frequency error that grows as a function of observation time [see J. Rutman and F. L. Walls, *Characterization of Frequency Stability in Precision Frequency Sources*, Proc. IEEE, Vol. 79, No. 6, June 1991, pp. 952–959]. Thus, it is important to examine the magnitude of these effects both from a device and a system standpoint.

The short term frequency stability considered herein is that measured over a time interval of several seconds to several hours. Measured over these periods good quality ovenized oscillators typically have short term stability (fractional frequency deviation, or so-called Allan variance) on the order of 0.00001 PPM. With this stability the timing signals from a basestation may be predicted over a future period of 10 minutes to an accuracy of 6 nanoseconds and over a future period of 1 hour to an accuracy of 36 nanoseconds.

The long term stability of good quality ovenized oscillators may be on the order of 0.001 PPM per day or better, corresponding to around 0.00004 PPM per hour [see *Fundamentals of Quartz Oscillators*, Hewlett Packard Application Note 200-2]. Thus, for predictions over a period of the order of an hour or more, the effects from aging characteristics can dominate.

From a measurement standpoint, Pickford considered the frequency drift between two basestations, based upon the use of round trip measurements [see Andrew Pickford, *BTS Synchronization Requirements and LMU Update Rates for E-OTD*, Technical Submission to Technical Subcommittee T1P1, Oct. 8, 1999]. He found that once a linear phase (or time) drift (i.e., fixed frequency offset error) was removed, the net RMS time error was on the order of 66 nanoseconds even for periods exceeding 1 hour. He also demonstrated that utilizing measurements over a 1 hour period and projecting them forward for the next hour yielded similar accuracy. Furthermore, an examination of his curves indicated that the residual error after removing the average drift was dominated by what appeared to be random errors. This might indicate that the predominant remaining errors were due to measurement errors, or additive noise, rather than actual oscillator jitter. Note that an error of 66 nanoseconds RMS, measured over an hour period, is equivalent to a frequency stability of around 0.000018 PPM, which is typical of a good quality crystal oscillator.

Another similar paper of T. Rantallainen, et. al., provided similar results to the above [see T. Rantallainen and V. Ruutu, *RTD Measurements for E-OTD Method*, Technical Submission to T1P1.5/99-428R0, Jul. 8, 1999]. However, in this paper several of the fits to phase vs. time required a second order polynomial in order to keep the residual errors low. Typical time intervals over which processing was done ranged from about 1500 to 2200 seconds. An explanation was not given for the nonlinear characteristic of the phase versus time plot. This may very well be due to aging characteristics of the crystal oscillator, as indicated above. Since aging characteristics tend to be predictable and smooth, the polynomial fit algorithm should work well. For example, a second order polynomial fit to frame period versus measurement time will compensate for a linear frequency versus time drift.

Additional factors that can contribute to small changes in frequency versus time include voltage and temperature fluctuations of the frequency references. These factors can manifest themselves as very small frequency changes. Basestations tend to have regulated voltages and temperatures in order to ensure high reliability.

When there is significant user motion, it is important that any Doppler related effects do not unduly influence the timing and frequency measurements described above. In particular, if the mobile station measures time at one instance and predicts the time-of-day associated with a cellular signal frame boundary occurring at a different instance, an error can result from the motion of the mobile station, especially if the mobile is rapidly moving and/or the difference between these time instances is large. There are a number of ways to deal with this type of problems. For example, when the mobile station can determine its velocity, the data about the velocity of the mobile station may be supplied to the server in order to compensate for the errors due to the Doppler effects associated with the range rate between the mobile and the basestation. This approach has been shown in FIG. 11. As described above, the GPS signals can be processed to estimate the velocity of the receiving platform. This information may be utilized to compensate for any errors due to the motion of the mobile station.

Some residual errors may remain, such as multipath delays and transit delays through the mobile station hardware. However, the mobile station and/or basestation can often determine the degree of such degradations and weight those measurements more heavily that have less error.

The effective times of transmission (i.e., the arrival time) are determined at the face of the basestation antennas. The use of a large number of mobile stations may tend to reduce errors via averaging procedures. This assumes that system biases may be eliminated or reduced by appropriate measurement selection or other bias estimation procedures.

Concerns about sufficient mobile station activity to support the timing (e.g. early morning hours) could be ameliorated by placing mobile stations at various locations and making calls periodically. However, these need not be fixed assets.

Typical timing errors due to the GPS processing at a single mobile station might be on the order of 10–30 nanoseconds. Thus, other sources of error, such as multipath may dominate.

The stability of the basestation oscillator affects how often timing measurements need to be made and disseminated. It is possible by use of a multiplicity of measurements from mobile stations to precisely determine not only the instantaneous frequency of the basestation oscillator, but also higher moments such as the rate of change of such frequency. As discussed above, it is normally the case that a simple curve fit to the basestation frequency versus time may be maintained to extremely high accuracy over long periods of time.

Although the methods and apparatus of the present invention have been described with reference to GPS satellites, it will be appreciated that the teachings are equally applicable to positioning systems which utilize pseudolites or a combination of satellites and pseudolites. Pseudolites are ground based transmitters which broadcast a PN code (similar to a GPS signal) modulated on an L-band carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolite or equivalents of pseudolites, and the term GPS signals, as used herein, is intended to include GPS-like signals from pseudolites or equivalents of pseudolites.

In the preceding discussion the invention has been described with reference to application upon the United States Global Positioning Satellite (GPS) system. It should be evident, however, that these methods are equally applicable to similar satellite positioning systems, and in particular, the Russian Glonass system and the proposed European Galileo System. The Glonass system primarily differs from GPS system in that the emissions from different satellites are differentiated from one another by utilizing slightly different carrier frequencies, rather than utilizing different pseudorandom codes. In this situation substantially all the circuitry and algorithms described previously are applicable. The term "GPS" used herein includes such alternative satellite positioning systems, including the Russian Glonass system and the proposed European Galileo System.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to measure a frequency related to a basestation of a cellular communication system, the method comprising:

receiving, at a mobile station, at least one satellite positioning system signal;

determining a frequency of a reference signal from a local oscillator of the mobile station from the at least one satellite positioning system signal;

receiving, at the mobile station, a first cellular signal from the basestation, the first cellular signal containing a first timing marker and a second timing marker;

determining a first time tag for the first timing marker and a second time tag for the second timing marker, using the reference signal from the local oscillator; and combining the frequency of the reference signal from the local oscillator with the first and second time tags to compute a first frequency related to the basestation.

2. A method as in claim 1 further comprising:

transmitting, through a communication link, the first frequency to a server.

3. A method as in claim 1 wherein said combining further comprises:
computing a time difference between the time tags.

4. A method as in claim 1 wherein the first frequency is related to a carrier frequency of a signal from the basestation.

5. A method as in claim 1 wherein the first frequency is related to a symbol rate of a signal from the basestation.

6. A system to measure a frequency related to a basestation, the system comprising:
a mobile station comprising:
  a cellular transceiver configured to receive from the basestation a cellular signal containing a first timing marker and a second timing marker;
  a local oscillator generating a reference signal;
  a satellite positioning system receiver coupled to the local oscillator, the satellite positioning system receiver configured to receive at least one satellite positioning system signal and to determine a frequency of the reference signal from the at least one satellite positioning system signal; and
  a processor coupled to the cellular receiver and the satellite positioning system receiver, the processor configured to determine a first time tag for the first timing marker and a second time tag for the second timing marker using the reference signal and to combine the frequency of the reference signal with the first and second time tags to compute a first frequency related to the basestation.

7. A system as in claim 6 wherein the satellite positioning system receiver is configured to determine location and velocity data of the mobile station using the at least one satellite positioning system signal.

8. A system as in claim 6 further comprising:
a server coupled to the mobile station through a communication link, the mobile station transmitting through the communication link the first frequency to the server using the cellular transceiver.

9. A system as in claim 6 wherein the satellite positioning system receiver and the cellular transceiver share at least one common component.

* * * * *